Dec. 11, 1962 J. W. COFFMAN 3,067,666
PRINTING APPARATUS FOR OVERHEAD PROJECTION SLIDES
Filed March 3, 1959 2 Sheets-Sheet 1
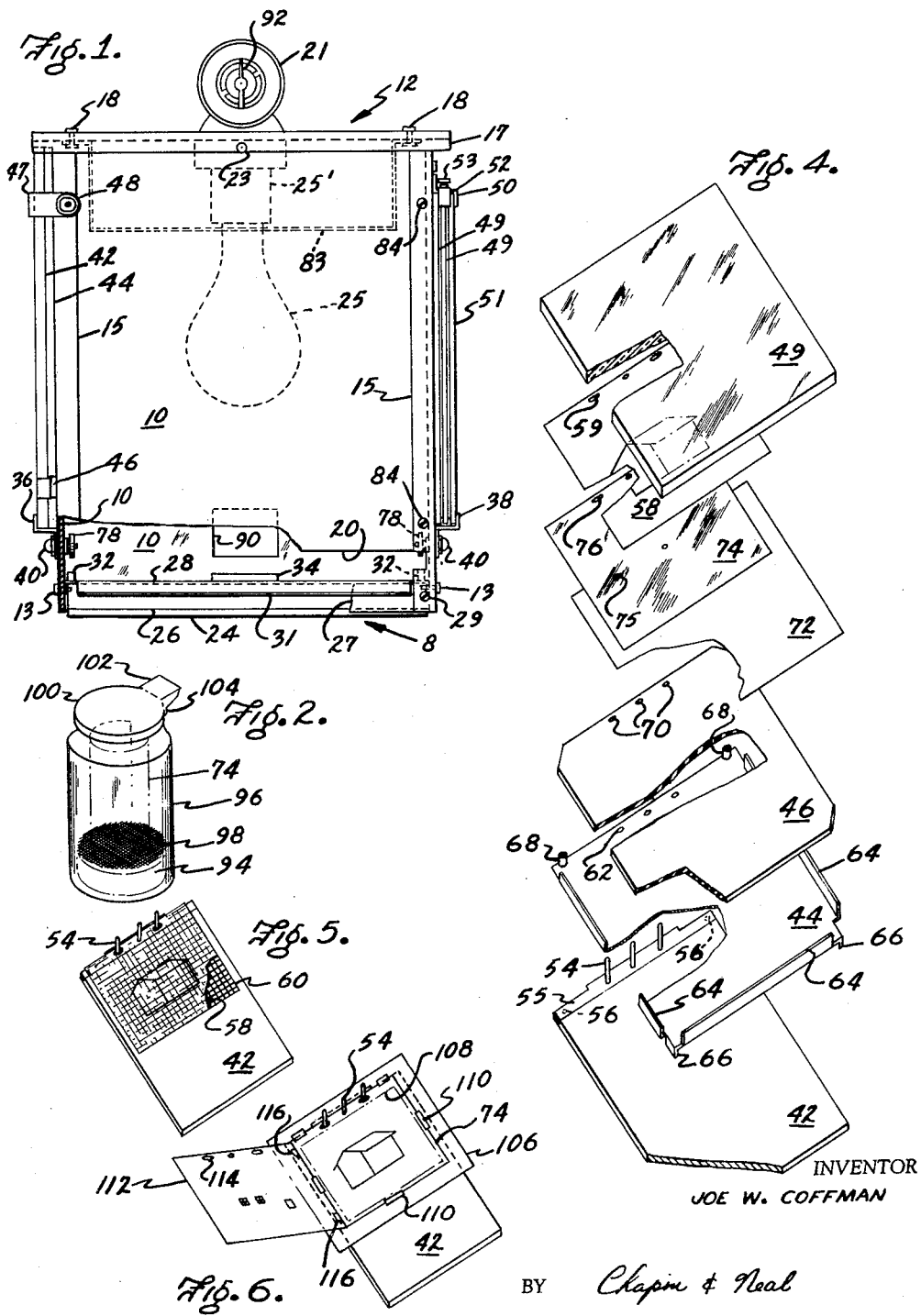
INVENTOR
JOE W. COFFMAN
BY Chapin & Neal
ATTORNEYS Dec. 11, 1962 J. W. COFFMAN 3,067,666
PRINTING APPARATUS FOR OVERHEAD PROJECTION SLIDES
Filed March 3, 1959 2 Sheets-Sheet 2
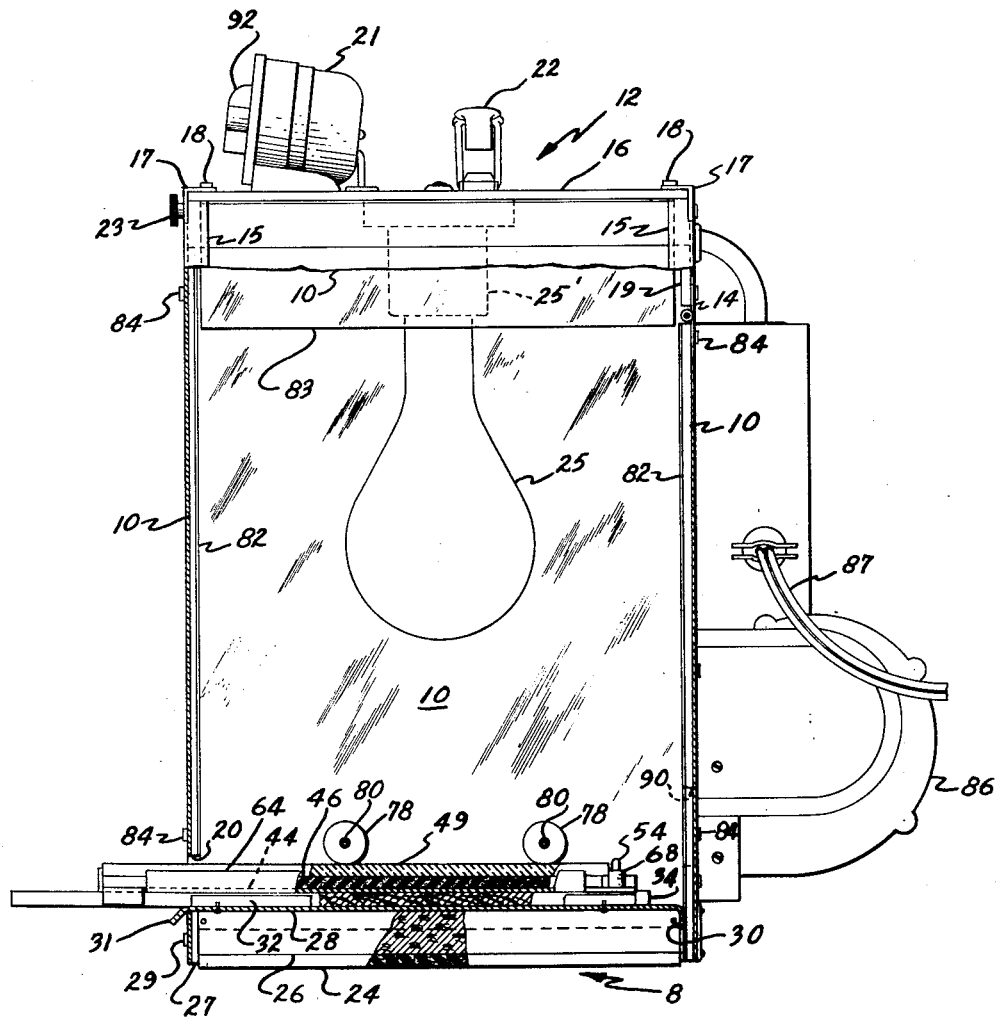
INVENTOR
JOE W. COFFMAN
BY Chapin & Neal
ATTORNEYS United States Patent Office 3,067,666
Patented Dec. 11, 1962

3,067,666
PRINTING APPARATUS FOR OVERHEAD
PROJECTION SLIDES
Joe W. Coffman, 929 Northampton Highway,
Holyoke, Mass.
Filed Mar. 3, 1959, Ser. No. 796,909
8 Claims. (Cl. 95—73)

This invention relates to photographic reproduction devices and in particular to printers for making diazo-type film prints for overhead projection slides.

With the rapid advances in present-day technology, there has arisen a great need for visual communications in the transmission of ideas for both merchandising and training purposes. The need for dynamic visual communication programs in schools, corporations, and various branches of the Armed Forces is greater today than at any time in the past. The field of visual communications is recognized as one of the most effective means for transmitting ideas, especially when the subject matter is of a technical nature. While many excellent techniques are presently available to the visual communicator, one technique which has won wide recognition in the field is overhead projection. Using this technique, a lecturer may control the showing of images on a screen without the assistance of a projector operator. The lecturer can locate the overhead projector in front of his audience and observe their reaction to his presentation while it is in progress. In conjunction with the overhead projection technique, slides may be used having a basic outline or background print and a number of hinged overlays which may be swung into registration with the outline print forming a composite image in step-by-step fashion. Slides of this type are known as dynamic slides since the overlay prints may be used for building up or breaking down a composite image as the lecturer desires. The visual impact of this technique is further enhanced by the use of overlays of different colors. Of course, the overlays may be disposed in fixed relation on a side mount to form multi-colored "static slides."

While apparatus and methods for the preparation of dynamic slides are presently available, the cost of such apparatus and the complexity of the methods have tended to limit their use. In any visual communication program, it is most desirable that an individual lecturer or instructor have at his disposal the means for preparing dynamic slides for the implementation of his lectures. To encourage wide use of visual communications, the apparatus for preparing such slides must be relatively inexpensive and simple to operate. In this way training groups or companies having limited budgets for such purposes will be encouraged to make use of such slides in training programs. Furthermore, if the system is made sufficiently inexpensive and simple to operate, its use will be encouraged by relatively small organizational components within large organizations resulting in training decentralization, which in many cases produces effective and dramatic results.

The principal object of this invention is to provide an improved diazo-type slide printer of simple and compact construction resulting in a low cost efficient unit capable of being operated by a person with a minimum of skill or training.

A further object of the invention is to provide an improved diazo-type printer having constructional characteristics such that a registration component thereof may be used not only in the printing of film transparencies but also in the preparation of art work from which the film transparencies are made and the asesmbly of developed transparencies in registered relation as slides for use in overhead projection.

The above objects, features and advantages of this invention will be more readily apparent from a reading of the following description with reference to the drawings.

In the drawings:

FIG. 1 is a front elevation of a photographic printer or exposure unit embodying this invention;

FIG. 2 is a perspective view of a simple developing jar unit which may be used with the exposure unit of FIG. 1;

FIG. 3 is a side elevation of the unit of FIG. 1 with parts cut away and on an enlarged scale;

FIG. 4 is an exploded view in perspective showing the components of a pin registration board "compression" assembly and materials for use in the operation of exposing a diazo-sensitized film sheet in the unit of FIGS. 1 and 3;

FIG. 5 is a perspective view on a smaller scale of a pin registration board and illustrating the preparation of images to be printed in the exposure unit; and FIG. 6 is a similar view of the pin registration board showing its use for the final assembly work in mounting a plurality of developed film sheets in registered relation on a frame.

Referring now in detail to the drawings the photographic exposure unit or printer is shown in FIGS. 1 and 3. It includes a base assembly 8 with upstanding walls 10 secured to the edges of the assembly by screws 13 to form a rectangular exposure chamber, and a cover assembly 12 hinged to the rear wall of the unit as shown at 14 (FIG. 3). The walls of the unit are preferably light weight tempered "Masonite" panels connected together in box-like fashion by angled corner strips 15. The strips 15 are preferably fabricated of aluminum so that the unit will be relatively light in weight. The top cover is also preferably a light weight "Masonite" panel 16 and includes L-shaped aluminum strips 17 secured to its front and rear edge portions by nuts 18. The lower edge portion of the rear strip 17 is also secured to a panel 19 which is in turn connected to the hinge 14 (FIG. 3). The unit includes an entrance slot 20 in the lower portion of the front panel which opens into the interior of the unit and as will be described below is adapted to receive the material to be printed in the unit. A timer 21 supported on top of the cover controls the exposure period. A handle 22 is mounted on the center of the top cover for carrying the unit, which is extremely light in weight, and is especially useful when the printer is being used in field operations. A thumb screw 23 extends through the front strip 17 and is adapted to be threaded into the front wall 10 of the unit for securing the cover assembly 12 in its closed position. A photo flood lamp 25 is supported from the cover panel 16 by a socket 25' which is secured to the center of the under surface of this panel.

The base assembly 8 (FIG. 3) of the printer comprises a rubber pad 24 and a cork filler 26 which is cemented to the upper surface of pad 24. A base plate 28 is cemented to the upper surface of the cork filler 26 and includes a planar upper surface and downwardly extending edge portion 30 (FIG. 3). The base plate 28 is of such size that its edge portions 30 are disposed in covering relation to the rear and side edge portions of the cork filler 26. Plate 28 further includes a front lip 31 at the lower edge of entrance slot 20, this lip being flared downwardly and outwardly from the planar portion of the plate. The screws 13 extend through the angle strips 15, the panels 10, and are threaded into the depending edge portions 30 of the base 28. A lower front panel 27 is secured to the lower end portions of the angle strips 15 by nuts 29. Panel 27 is disposed against the front edge portions of pad 24 and filler 26. Elongated guide strips or bars 32 (FIG. 1) are secured to the upper surface of the base 28 adjacent the side edges, and stop bar 34 is secured on the upper surface of the plate 28 adjacent and parallel to the rear wall of the unit.

Angled brackets 36 and 38 (FIG. 1) are secured to the outer side walls of the printer by acorn nut assemblies 40, two of which extend through each of the brackets 36 and 38. The brackets support components used in the printing operation. Such components, as will be more fully described below are best shown by FIG. 4. As mounted in bracket 36 there is included a pin registration board 42, an adapter tray 44, and a resilient pad 46. The board, tray and pad are held in place on bracket 36 by a strap 47 fastened to the rear wall of the box at one end and releasably secured to the front wall by means of snap fastener 48. Bracket 38 on the other side is provided to support glass compression plates 49 one of which is used for each exposure operation. An upper bracket 50 is also provided to hold the top edges of plates 49, a shield 51 protecting the plates from damage and is preferably made of a tempered "Masonite" material similar to the walls of the unit. A clip 52 is pivotally mounted on a thumb screw 53 threaded into the upper bracket 50. This clip is provided to engage the front top corner edges of the plates 49 and prevents them from sliding out of brackets 38 and 50. Upper bracket 50 includes a depending rear wall portion to engage the rear edges of the plates and hold them in place. The plates 49 may be readily removed from the brackets by loosening screws 53 and pivoting clip 52 outwardly. The plates then will slide forwardly.

It will be noted the exposure unit, as described is an extremely compact, light weight, self-contained portable unit readily adapted for field use. It is furthermore extremely simple to operate and may be set up on a moments notice by simply removing the above-described components from the side wall brackets. The unit is then ready for operation.

Referring more particularly to the pin registration board 42, (FIGS. 4, 5, 6) this will be noted as of generally rectangular shape with a flat planar upper surface. Three registration pins 54 extend vertically from the upper surface of a metallic plate 55 secured in a recessed upper edge portion of the board by means of screws 56. The pins 54 are of a height less than the height of the slit 20 so that the board will slide into the printer through the slot. The metal plate 55 is in the same plane with the surface of the board. Pins 54 are disposed in spaced aligned relation adjacent the upper edge of the board.

In using the registration board to its greatest advantage this component may be characterized as a "work horse" in the production of dynamic or static slides for overhead projection work. The board can most advantageously function in three separate and distinct capacities. In a first capacity, it can be used for making up the original art work on a plurality of master sheets from which the transparency film sheets of the slides may then receive the images. Secondly, it can perform a necessary function in the reproduction of the master sheet image on the film prints. In this function it is related directly to the apparatus herein described. And third, it may be used in the final assembly of the film prints for mounting the finished dynamic or static slides.

Briefly describing the preparation of original art work, a sheet of transparent or translucent material, indicated at 58 in FIGS. 4 and 5, is used. Such sheets are provided with holes 59 at the top edge thereof punched to receive the registration pins 54 of board 42. Portions of this sheet are then opaqued in any desired fashion such as by drawing lines or pasting cutouts thereon. As thus prepared the sheet is known as a master and may be used for preparing a number of photographic copies or reproductions on sensitized film sheets.

The first such master sheet is generally prepared to show an outline or background image for superimposing additional portions of a composite picture by other film sheets. For purposes of illustration, the outline of a house is shown in FIG. 5. Other master sheets punched with holes are then prepared with respect of this outline by successively superposing them on top of the sheet 58 and registering them therewith by using the pins 54 of the board 42. Each sheet is made up with the desired arrangement for adding to the outline image or other sheets for producing the intended composite picture. For example, an additional master sheet may be prepared to show doors or windows. Such component parts may be accurately positioned with respect to the house outline of sheet 58 by the superposed sheet registration on the board. A sheet 60 may also be provided with registered openings for the pins 54. When placed beneath the translucent master sheets the grid markings of sheet 60 greatly facilitate the preparation of the desired image. When the desired master sheets are made on the pin registration board the several images may then be reproduced by using the board and printer apparatus shown in the drawings. The components interrelated with the board for insertion in exposure chamber of the unit of FIGS. 1 and 3 are shown by FIG. 4.

The adapter 44 previously described as mounted against the left side of the box of FIG. 1 for storage and portability is in the form of a tray (FIG. 4). It modifies or adapts the board 42 to mount the master and copy or transparency film sheets for the printing operation. This tray is generally rectangular and has three holes or openings 62 disposed adjacent its upper edge for receiving the pins 54 of the registration board 42. It also has upwardly flanged wall portions 64 at its side and lower edges. Depending side tabs 66 at the lower edges engage the sides of board 42. The tabs and pins accurately and securely register the tray on the board. The tray further includes upstanding rubber covered studs or bumpers 68 at the top corners thereof for the abutment of the upper edge of the glass plate 49 when positioned on the tray. This prevents chipping of the glass against the registration pins 54.

A compressible or resilient pad 46 is also provided with registration holes or openings 70 to mount on the pins 54. The pad is preferably fabricated of foam rubber material and fits snugly within the tray walls 64 when holes 70 are placed over pins 54. The resilient pad thus does not shift on the tray.

Next in order an interleaf 72 having pin registration holes 75 is placed on the upper surface of the pad 46. Preferably the interleaf is made of white card stock and provides a reflective backing for the sheet of film 74 which is to be developed. Sheet 74 having corresponding holes 76 is then placed on top of the interleaf with its light-sensitive surface facing upwardly. Next the previously prepared master sheet 58 is placed on top of the film sheet and accurately registered therewith by its pin registration holes 59. One of the glass plates 49 which is preferably an ultra-violet type of glass, is placed on the top of this assembly covering the master sheet directly. The upper edge of plate 49 abuts the upstanding bumpers 68 and the plate is of a size to be securely fenced in by the side walls 64 of the tray. The walls 64 rise slightly above the undersurface of the plate (FIG. 3) and prevent transverse movement on the tray.

The master sheet 58 and the film sheet 74 are thus sandwiched between the compression pad 46 and the glass plate 49 in fixed accurately registered relation for the correct placement of the image on the sheet 74. This unit of FIG. 4 may be termed a compression assembly, the tray and pad forming a lower platen and the glass an upper platen. The pins 54 preferably extend at least above the upper surface of the pad 46 a sufficient distance to receive the master sheet and film sheet when supported on the upper surface of an interleaf, and are furthermore dimensioned for being received in the slot 20 of the exposure chamber, The slot 20 extending horizontally across the front of the printer receives the compression assembly with the under surface of board 42 sliding smoothly on the surface of plate 28. The flared lip at 31 guides insertion of the compression assembly into the slot with the side bars 32 guiding further movement along the sides thereof. The guides 32 being spaced apart slightly more than the width of the board 42 thus insure proper registration in the exposure chamber in a lateral sense. Stop 34 on base 28 limits the extent of travel into the printer for a completely predetermined position therein.

It will be noted from FIG. 3 that hold-down bearings 78, preferably rollers, are mounted on the inner end portions of the nut assemblies 40 which extend through the side walls 10 of the printer. Rollers 78 are held on nuts 40 by means of snap rings at 80 (FIG. 3) and are positioned inwardly of the adjacent side walls to engage the upper marginal edge surfaces of the glass plate 49. The rollers being vertically positioned, the lower edge portions thereof are spaced from the upper surface of the base 28 a distance somewhat less than the distance from the under surface of the board 42 to the upper surface of the glass plate 49 of the compression assembly so that when the compression assembly slides into the printer the glass plate 49 is engaged by the rollers to press the plate against the pad 46. The master 58 and the film sheet 74 sandwiched between the glass and pad are thus forced into a flat surface-to-surface contact to insure clear film prints. With the assembly in the printer, the film 74 may be exposed to the light of the lamp 25. The areas of the diazo-film which are not masked by the opaque lines of the master sheet are burned out by the ultra-violet light emitted by the lamp as is well known in this art.

For most effective printing of diazo-type film, it has been found preferable to utilize a No. 4 photo flood lamp which emits a light having a high percentage of ultraviolet. The inner surfaces of walls 10 are lined with a highly reflective material, preferably "Alzac" aluminum, a material which is highly reflective to light in the ultraviolet band and extremely light weight while having great strength.

The panels 82 of "Alzac" are held in place by T-nuts 84. Another panel 83 of "Alzac" is also secured to the cover assembly 12 by means of nuts 18 which extend through the cover panel 16 and angle strips 17. Panel 83 includes downwardly extending portions and a central portion which is spaced from the cover 16 and encloses lamp socket 25'. A center opening receives the inner end of lamp 25 for threading in the socket 25'. This construction insures maximum reflectivity for the light emitted by lamp 25. Timer 21 disposed on the upper surface of the cover assembly operates a switch for controlling operation of the lamp 25 and a fan or blower shown generally at 86. An electrical cord 87 connects the printer to a source of electrical power.

The rear wall of the printer is provided with an opening 90, best seen in FIG. 1 through which air is passed by the blower. Air is forced over the upper surface of the glass plate 49 and passes out through slot 20 at the front wall. The relative location of these slots with respect to the compression assembly insures a rapid air flow over the upper surface of the glass plate, thus maintaining the glass and the film sheet disposed therebelow in a relatively cool condition. It will be noted the unit is provided with two glass plates 49 and preferably the plates are alternately used so that a relatively cool plate is ready for insertion in the assembly.

The amount of time for any given exposure period depends upon the color of the film used and the light transmitting characteristics of the master sheet. A convenient chart or table (not shown) is provided for use in conjunction with the unit to list timing for each color film which may be processed. The timer 21 is set to any selected limit by rotating pointer arm 92 to light the lamp and run the fan for the desired interval. The timer then progressively returns to its zero value when the unit shuts off and the compression assembly may be withdrawn through the slot 20.

Each sheet as it is removed from the assembly is then developed by placing in a developer unit, a simple example of which is shown in FIG. 2.

While many types of developer units are available for use with diazo-type film, a transparent jar 96 offers advantages for use with the printer. It is light in weight, simple to operate, and parts are readily replaceable at low cost. Moreover, the process of development may be observed by an operator and the film removed at the desired stage of development. At the bottom of the jar is a sponge 94 immersed in ammonia. A spacer or shield 98 is placed on the upper surface of the sponge 94 in the form of a rubber screen to prevent direct contact between film and sponge 94. The ammonia fumes are evenly dispersed throughout the interior of the jar. A cover 100 for the jar has an outwardly extending lever portion 102 by which the cover may be opened and closed, the cover being pivotally mounted on a pin at 104. The operator can watch the progress of the developing operation and remove the film when he considers a sufficiently sharp image has been brought out.

The developed prints are thereafter assembled and mounted in registered relation as illustrated in FIG. 6. This assembly or mounting is accomplished by again utilizing the pin registration board 42. The board used as a registration component of the compression assembly above described, is now made available for the mounting operation by the removal of the adapter tray 44 and associated elements. A mounting frame 106 having holes disposed adjacent its upper inner edge 108 is placed on the planar upper surface of the board, the holes of the frame receiving the pins 54. It may be noted that frame 106 extends beyond the edges of the board 42. However, since there are not protrusions or upstanding edges on the board, the frame 106 lies substantially in a flat condition on the upper surface of the board.

A developed film print 74 showing the outline of the object to be projected, is first placed on top of the frame with its holes 76 receiving the registration pins 54 of the board. The outline print is then secured in such registered relation on the frame 106 by any suitable means. Preferably as shown, pressure sensitive adhesive strips are taped along the edges as at 110 (FIG. 6). The overlay prints, the master sheets of which were initially prepared in registration with the outline master sheet on the registration board, may now be connected to the frame 106 in registered relation with the film sheet bearing the outline of the composite object of the slide. An overlay sheet, shown in FIG. 6 at 112, has a door and windows for the house of the first sheet. This sheet is registered by holes 114 on the pins. As thus registered sheet 112 is then hinged to frame 106 by tabs 116. It will be noted sheet 112 will be exactly set on sheet 74 since the master sheets from which the film sheets were reproduced were originally prepared in the desired position of registration on the same registration board 42, and sheets 74 and 112 were reproduced from such masters in exact registered relation by using the same registration board 42 during the printing operation. One or more overlays, such as 112, may, of course, be hinged to the frame 106. A slide thus prepared insures accurate registration or alignment of the component portions of the composite image and when used in conjunction with an overhead projector, the composite image may be built up in step-by-step fashion by the instructor. The slide, of course, may be used by first projecting the composite image on the screen and then breaking it down in step-by-step fashion to its simple outline form. In any event by using the apparatus and technique herein described, the components of the object will be projected in their correct relationships since the overlays are accurately registered with the outline print.

What is claimed is:
1. Printing apparatus for reproducing an image from a master sheet onto a film sheet comprising a wall-defined exposure chamber having light reflective inner surfaces, a flood lamp supported within said chamber and spaced above the bottom thereof, an opening communicating with the interior of said chamber; a compression assembly for holding said master and film sheets in contactual superposed registration, said assembly being removably insertable into said exposure chamber through said opening and comprising a first member having a generally planar upper surface and registration pins extending upwardly therefrom and adjacent an edge thereof, a tray member having openings for receiving said pins and including wall portions disposed upwardly with respect to said planar surface, a resilient pad carried by said tray member and having an upper surface at least as large as said sheets, a transparent plate removably mountable on said pad and carried by said tray; and means extending inwardly from the side walls of said chamber and positioned to engage the upper surface of said plate for compressing said pad when the assembly is inserted into said chamber whereby master and film sheets having correspondingly disposed holes receiving said pins and disposed between said pad and plate are pressed into registered planar engagement.

2. Printing apparatus for reproducing an image from a master sheet onto a film sheet comprising a wall-defined exposure chamber, the inner surfaces of said walls being lined with material highly reflective to ultra-violet light, a flood lamp supported within said chamber in spaced relation with the bottom thereof, a slot opening into said chamber; a compression assembly for holding said master and film sheets in superposed registered relation and adapted to be removably inserted into said chamber through said slot, said compression assembly comprising a board member having a generally planar upper surface portion and registration pins extending upwardly therefrom and adjacent an edge thereof, an adapter having openings for receiving said pins and including wall portions disposed upwardly with respect to said planar surface, a resilient pad having openings for receiving said pins and adapted to be carried by said adapter and held in fixed relation thereto by the wall portions of the adapter, a transparent plate adapted to be removably mounted on said pad and dimensioned to be received within the area defined by the upstanding pins of said board and the wall portions of said adapter; and means extending inwardly from the side walls of said chamber and positioned to engage the upper surface of said plate for compressing said pad when the assembly is inserted into said chamber whereby master and film sheets having correspondingly disposed holes receiving said pins and disposed between said pad and plate are pressed into registered planar engagement.

3. Printing apparatus for reproducing an image from a master sheet onto a film sheet comprising an exposure unit having a base portion, upwardly extending wall portions and a cover, the inner surfaces of said wall portions and said cover being lined with a material highly reflective to ultra-violet light, a flood lamp supported within said chamber and disposed at the center thereof in spaced relation with the bottom of said chamber, a horizontally disposed slot opening into said exposure unit and adjacent the base portion thereof, a compression assembly for holding said master and film sheets in superposed registered relation and adapted to be removably inserted into said exposure unit through said slot, said compression assembly comprising a board member having a generally planar upper surface and three registration pins extending upwardly therefrom in spaced aligned relation and adjacent the upper edge thereof, an adapter tray having openings adjacent its upper edge for receiving said pins and including wall portions extending upwardly from the other edges of said tray, said tray further including downwardly extending tabs adapted to engage the side edges of said board when the tray is positioned on said board, a rubber pad having openings adjacent one edge thereof for receiving said pins, the other edges of said pad being disposed within and contiguous to the wall portions of said tray, said pins and said wall portions extending at least as high as the upper surface of said pad in its uncompressed condition, a glass plate adapted to be removably mounted in superposed relation on said pad and of a size to be received with the space defined by said registration pins and the upstanding walls of said tray; and rollers supported by the side walls of said exposure unit adjacent the inner surfaces thereof and vertically positioned to engage the upper surface of said plate for compressing said rubber pad when the assembly is inserted into said unit whereby master and film sheets having correspondingly disposed holes receiving said pins and disposed between said pad and plate are pressed into registered planar engagement.

4. Printing apparatus for reproducing an image from a master sheet onto a film as set forth in claim 3 above in which said exposure unit includes a stop positioned to engage said assembly for limiting the insertion of said assembly into said unit to a predetermined position which is in registered relation with said flood lamp and said adapter tray includes upwardly extending bumper members positioned to be engaged by an edge of said glass plate preventing contact of said plate with the registration pins of said board.

5. Printing apparatus for reproducing an image from a master sheet onto a film sheet as set forth in claim 4 above in which said exposure unit includes means engageable with the side edges of said board member for laterally registering said device in said exposure unit.

6. A registration device for use in the reproduction of an image from a master sheet onto a film sheet comprising a board having a planar upper surface portion, registration pins extending upwardly from the planar surface and adjacent one edge of said board, an adapter tray of greater width than said board having openings adjacent a corresponding edge for receiving said pins and including wall portions extending upwardly from the other edges of said tray, a resilient pad member carried by said tray, said film and master sheets having registration holes for receiving the pins of said board, and a discrete transparent plate member adapted to be carried in superposed contactual relation with said pad for holding master and film sheets disposed therebetween in planar engagement for photographic printing, the registration pins and the wall portions of said tray extending at least as high as the lower surface of said plate when disposed on said pad and serving to hold said plate in fixed relation thereon, said adapter tray and the members carried thereby being removable from the board for enabling the board to be used for the registered preparation of images on master sheets and for the registered assembly of film sheets reproduced from said master sheets.

7. A registration device for use in the reproduction of an image from a master sheet onto a film sheet comprising a board having a planar upper surface portion, three registration pins extending upwardly from said planar surface and disposed in spaced aligned relationship adjacent the upper edge of said board, an adapter tray having three correspondingly placed openings adjacent its upper edge for receiving said pins and including wall portions extending upwardly from the side and lower edges of said tray, said tray further including tabs extending downwardly from said edge portions thereof for engaging the side edges of said board, a rubber pad having openings adjacent one edge for receiving said pins, the other edges of said pad being disposed within and contiguous to the wall portions of said tray, said film and master sheets having registration holes for receiving said registration pins, and a transparent glass plate of sufficient size for urging said master and film sheets disposed between the plate and pad into planar engagement for photographic printing, the edges of said plate being disposed within and contiguous to the wall portions of said tray, said walls and the registration pins of said board terminating at a height above the lower surface of said plate and serving to hold said plate in fixed relation on said pad, said adapter tray and the members carried thereby being removable from the board for enabling the board to be used for the registered preparation of images on master sheets and for registered assembly of film sheets reproduced from said master sheets.

8. Printing apparatus for reproducing an image from a master sheet onto a film sheet comprising an exposure chamber, a source of illumination within said chamber, a slot communicating with the interior of said chamber, a registration device comprising a pin registration board having a planar upper surface with registration pins extending upwardly therefrom and a structurally discrete compression assembly having openings for removably receiving the pins of said registration board, said slot being of sufficient size to accommodate the passage of said registration pins, said assembly including a resilient pad and a transparent plate, the pins of said pin registration board serving to hold said master and film sheets in registered relation between said pad and plate and to hold the compression assembly in place on said board, said compression assembly being separable from said board enabling use of said board for identical registration of images on master sheets and for identical registration of film sheets produced from said master sheets.

References Cited in the file of this patent

UNITED STATES PATENTS

| | | |
|---|---|---|
| 780,590 | Anderson | Jan. 24, 1905 |
| 2,153,159 | Schubert | Apr. 4, 1939 |
| 2,163,776 | Current | June 27, 1939 |
| 2,249,228 | Rogers | July 15, 1941 |
| 2,301,239 | Arndt | Nov. 10, 1942 |
| 2,301,675 | Arndt | Nov. 10, 1942 |
| 2,336,663 | Walters | Dec. 14, 1943 |
| 2,365,225 | Stiffler | Dec. 19, 1944 |
| 2,399,975 | Ball | May 7, 1946 |
| 2,498,417 | Haff | Feb. 21, 1950 |